(No Model.)

W. T. NICHOLSON.
FORMING TEETH UPON FILE BLANKS AND APPARATUS THEREFOR.

No. 265,975. Patented Oct. 17, 1882.

WITNESSES.
W. H. Thurston.
L. Knight.

INVENTOR.
Wm T. Nicholson.

N. PETERS, Photo-Lithographer, Washington, D. C.

UNITED STATES PATENT OFFICE.

WILLIAM T. NICHOLSON, OF PROVIDENCE, RHODE ISLAND.

FORMING TEETH UPON FILE-BLANKS AND APPARATUS THEREFOR.

SPECIFICATION forming part of Letters Patent No. 265,975, dated October 17, 1882.

Application filed March 3, 1882. (No model.)

*To all whom it may concern:*

Be it known that I, WILLIAM T. NICHOLSON, of the city and county of Providence, and State of Rhode Island, have invented a new and Improved Method or Process of Forming the Teeth upon File-Blanks and Devices or Apparatus for Performing the Same; and I do hereby declare that the following specification, taken in connection with the accompanying drawings, forming a part of the same, is a full, clear, and exact description thereof.

By my invention, hereinafter described, there can be produced those varieties of very delicate files in use among jewelers, watch-makers, dentists, and others, the teeth of which are of extreme fineness, numbering about seventy-five to the inch and upward, which class of files it is not practicable to make by the usual process of raising the teeth by the blow of a chisel.

In the accompanying drawings I have illustrated several forms of tools by the use of which my process of forming the teeth of files on properly-prepared blanks can be accomplished.

Figure 1 represents a cylindrical bar, A, of hardened steel, about one-half an inch in diameter (more or less) and of any convenient length, which is furnished at its ends with handles B B, for enabling the operator to hold and work it with both hands. The body of the bar A is provided with as many spiral grooves to the inch in length as it is intended the file-blank to be cut by the tool shall have teeth to the inch. For example, if it is desired that the file shall have one hundred teeth to the inch the number of spiral grooves upon the tool will be one hundred to the inch. The form of the grooves should be such as will produce the particular form of teeth desired to be made on the file-blank. The grooves in the tool shown at Fig. 1 may be supposed to be of "ratchet" formation, and consequently would produce ratchet-shaped teeth upon a file-blank.

Fig. 2 represents a cylindrical bar, A, of steel, similar to that shown in Fig. 1. The grooves are formed in this instance parallel with each other and longitudinally of the tool. These grooves, as in the first instance, may be of any preferred form, corresponding with the shape of teeth desired for the file, and the number of grooves to the inch, measured on the circumference of the tool, should be equal to the number of teeth to the inch which it is desired the file shall have.

Figure 1:
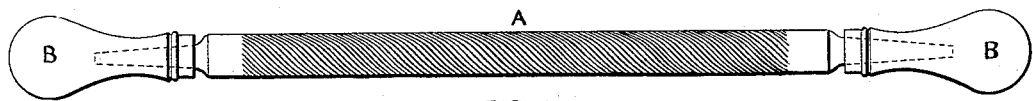
Figure 8:
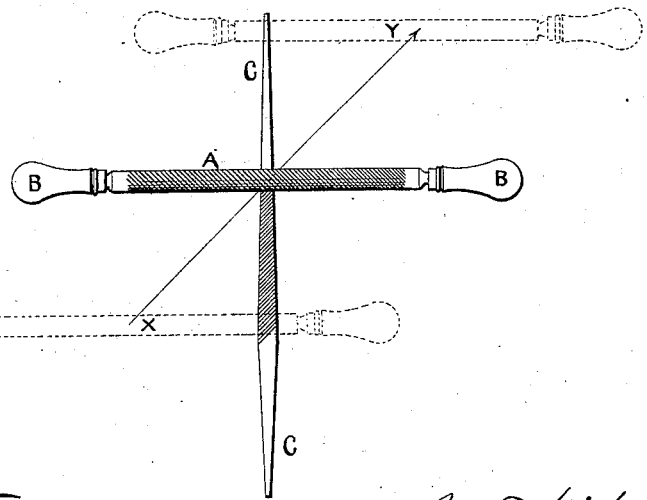

At Fig. 8 there is illustrated the method by which, with the aid of one of the forms of tools that I have described, a file-blank can be covered with teeth. C represents a small file suitable in size for jewelers' work. The teeth, however, are represented much coarser than they would be in fact. In files of this size the teeth would be in number from seventy-five to one hundred to the inch, and would extend from the butt of the tang to the extreme point of the file. The blank having been secured properly upon a horizontal bed, the operator takes a tool—such, for example, as that shown at Fig. 1—and, holding it with both hands by the handles B B, places it upon the blank at the position indicated by the dotted lines representing the tool, designated as X. He next moves the tool in the direction indicated by the arrow, Fig. 8, which direction corresponds with the pitch of the grooves in the tool to the position indicated in the figure by the dotted lines marked Y. During this movement of the tool from one position to the other a strong pressure is exerted, and care should be taken to preserve throughout the entire movement the same relation between the axis of the tool and the axis of the file-blank. The effect will be that a series of diagonal draw cuts, corresponding in number to the inch with the number of grooves to the inch on the tool, will be made upon the surface of the blank from heel to point, and the teeth will be produced upon the blank of a form corresponding in section with the form of the grooves in the tool, the intermediate spaces between said teeth corresponding in form with the salient portions of the tool. The operation can be repeated as many times as may be necessary to produce fully-formed teeth upon the entire surface of the blank, care being taken with every successive operation to hold the tool in such position relatively to the file-bank as not to impair the partially-formed teeth resulting from the previous operations of the tool by changing too much the relation of the axis of the tool to the axis of the blank to be cut. By the method described, with the aid of tools of the character, substantially as described, teeth can be formed upon blanks intended for this fine description of files, some of which are smaller than a darning-needle, perfect in form, but numbering so many to the inch as not to be separately distinguishable without the aid of a glass of high magnifying power.

Figure 2:

While I have represented at Fig. 8 a small "square" file-blank, for illustration, the blank may be of any of the usual forms required for the work of watch-makers, dentists, and in the arts; and the forms of the tools may be varied to meet the conditions required by different blanks. Thus, for example, a tool such as is represented at Fig. 2 would be suitable to be used in case there were a curved section of a file-blank the concave surface of which was desired to be covered with teeth. In such case this tool would be used to perform its work by moving it over the concave surface to be cut in a longitudinal direction, combined with a rotary movement around its axis, and it will be best so to mount the handles upon the tool that the tool can revolve in them.

Figure 3:
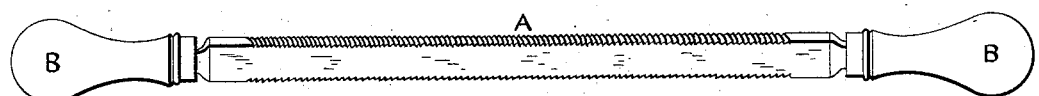
Fig. 3 represents a tool in its characteristics and features the same as that shown in Fig. 1, with the difference that the body A of the tool is not cylindrical in form, but has two plain parallel sides and two convex edges, upon which latter the grooves are formed.
Figure 4:
Fig. 4 represents a tool similar in character to that shown in Fig. 2, with the exception that the former has three flat sides, one of which is grooved and one convex side, which is also grooved, as shown on an enlarged scale in transverse section at Fig. 7.
Figure 5:
Fig. 5 is intended to represent, on an enlarged scale a transverse section of the tools shown in Figs. 1 and 2.
Figure 6:
Figs. 6 and 7 are intended to represent on an enlarged scale transverse sections of the tools shown in Figs. 3 and 4, respectively.
Figure 7:
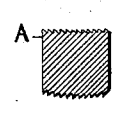

The tool represented at Fig. 3 is useful in case it is desired to cut close up to an abrupt shoulder, and the tool shown at Fig. 4 will be useful upon blanks having a convex curvature of considerable radius.

It will be readily understood from the foregoing description of the method which I have devised for forming the teeth on file-blanks by the aid of tools having characteristics such as I have indicated that the angle which the teeth formed upon the blanks will bear to the axes of the blanks will depend entirely in any given tool—such, for example, as that represented at Fig. 8—upon the angle at which such tool is held relatively to the axis of the blank; but whatever the angle selected may be for holding the tool the same angle should be preserved substantially for every one of the movements of the tool over the surface of the blank required to fully form the teeth thereon.

I do not mean to confine myself to the precise forms of tools illustrated in the drawings, as such forms can be greatly varied to suit the different shapes and requirements of blanks to be cut.

What I claim as my invention, and desire to secure by Letters Patent, is—

1. The improved method, substantially as herein described, of forming file-teeth upon file-blanks, consisting in causing a tool having the characteristics of construction, substantially as described, to be rubbed under pressure over the surface of the blank, while the axis of such tool is held relatively to the axis of the blank, as set forth.

2. The tool for forming teeth upon the surfaces of file-blanks, consisting of a bar of hardened steel grooved or threaded so as to have salient cutting-sections corresponding in number to the inch with the number of teeth to the inch with which the blank is to be cut, and adapted to be rubbed under pressure over the surface of the blank, substantially as described.

WILLIAM T. NICHOLSON.

Witnesses:
W. H. THURSTON,
I. KNIGHT.